United States Patent
Lin

(10) Patent No.: US 8,320,087 B2
(45) Date of Patent: Nov. 27, 2012

(54) SWITCHING REGULATOR CONTROL CIRCUIT

(75) Inventor: Hung-Lin Lin, Hsinchu (TW)

(73) Assignee: Richpower Microelectronics Corporation (KY)

( * ) Notice: Subject to any disclaimer, the term of this patent is extended or adjusted under 35 U.S.C. 154(b) by 128 days.

(21) Appl. No.: 12/928,540

(22) Filed: Dec. 14, 2010

(65) Prior Publication Data
US 2011/0279930 A1 Nov. 17, 2011

(30) Foreign Application Priority Data
May 17, 2010 (TW) .............................. 99209224 U

(51) Int. Cl.
*H02H 9/02* (2006.01)
(52) U.S. Cl. .......................................................... 361/18
(58) Field of Classification Search ...................... 361/18
See application file for complete search history.

(56) References Cited

U.S. PATENT DOCUMENTS 5,467,242 A * 11/1995 Kiraly .............................. 361/94
2010/0172063 A1 * 7/2010 Liu et al. ........................ 361/118
* cited by examiner Primary Examiner — Jared Fureman
Assistant Examiner — Nicholas Ieva
(74) Attorney, Agent, or Firm — Tung & Associates

(57) ABSTRACT

The present invention discloses a switching regulator control circuit which distinguishes the output short-circuit condition, which imposes immediate danger, from other mild over current conditions. The switching regulator control circuit includes: an over current judgment circuit comparing a current sense signal with a current limit to generate an over current indication signal; a time comparison circuit comparing the over current indication signal with a clock signal to generate an output short-circuit indication signal; and a timer receiving the over current indication signal and the output short-circuit indication signal, wherein when the output short-circuit indication signal does not indicate output short-circuit, the timer counts a first time period, and when the output short-circuit indication signal indicates output short-circuit, the timer counts a second time period shorter than the first time period, for better safety protection.

5 Claims, 5 Drawing Sheets

SWITCHING REGULATOR CONTROL CIRCUIT

BACKGROUND OF THE INVENTION

1. Field of Invention

The present invention relates to a switching regulator control circuit; particularly, it relates to a switching regulator control circuit with output short-circuit quick-response protection function.

2. Description of Related Art

For safety protection, a switching regulator control circuit needs to shut down output power from a switching regulator when an abnormal condition occurs which causes the current to exceed a current limit for a period of time.

FIG. 1 shows a schematic circuit diagram of a prior art AC-DC switching power converter circuit. As shown in FIG. 1, a switching regulator 10 converts an input voltage from an input terminal Vin to an output voltage by a transformer 11, and supplies the output voltage to an output terminal Vout. The transformer 11 includes a primary winding and a secondary winding. An optocoupler 12 is provided, for transmitting a feedback signal COMP to a switching regulator control circuit 20. The switching regulator control circuit 20 provides a switching signal GATE for controlling a power transistor switch 13. An input current IL through the power transistor switch 13 flows through a resistor Rcs, and the switching regulator control circuit 20 obtains the voltage across the resistor Rcs as a primary side input current sense signal CS. The switching regulator control circuit 20 generates an over current protection signal according to the input current sense signal CS and the feedback signal COMP. When the over current protection signal exceeds a current limit for a predetermined period of time, the switching regulator control circuit 20 outputs a short circuit protection signal for safety protection.

The conventional over current protection (OCP) mechanism is to compare a circuit current (input or output current) with a predetermined upper limit, and to count the time period in which the circuit current is over the upper limit. When the time period reaches a predetermined threshold, the circuit triggers an OCP protection measure. However, if the over current condition is caused by output short-circuit, a very large amount of current will be generated within a very short time, and this may cause damages to the circuit before the OCP protection measure is triggered. The OCP mechanism in the prior art switching regulator control circuit is designed for general over current conditions, but it can not respond in time to output short-circuit condition.

In view of the foregoing, the present invention provides a switching regulator control circuit with output short-circuit quick-response protection function. The present invention can distinguish the output short-circuit condition, which imposes immediate danger, from other mild over current conditions, to improve the safety protection for the switching regulator. Moreover, the present invention does not require complicated circuitry which consumes large area.

SUMMARY OF THE INVENTION

An objective of the present invention is to provide a switching regulator control circuit, which distinguishes the output short-circuit condition from other mild over current conditions and generates an output short-circuit protection signal in time.

To achieve the objective mentioned above, from one perspective, the present invention provides a switching regulator control circuit comprising: an over current judgment circuit comparing a current sense signal with a current limit to generate an over current indication signal; a time comparison circuit comparing the over current indication signal with a clock signal to generate an output short-circuit indication signal; and a timer receiving the over current indication signal and the output short-circuit indication signal, wherein when the output short-circuit indication signal does not indicate an output short-circuit condition, the timer counts a first time period, and when the output short-circuit indication signal indicates an output short-circuit condition, the timer counts a second time period shorter than the first time period, and the timer outputs an output short-circuit protection signal at the end of the second time period.

In one preferred embodiment, the over current judgment circuit includes a comparator for comparing the current sense signal with the current limit.

In one preferred embodiment, the time comparison circuit includes a flip-flop which has a signal input terminal and a clock input terminal, wherein the signal input terminal is coupled to the clock signal and the clock input terminal is coupled to the over current indication signal.

In another preferred embodiment, the time comparison circuit includes a logic gate receiving the over current indication signal and the clock signal, and generating an output signal; and a flip-flop having an signal input terminal and a clock input terminal, wherein the signal input terminal receives the output signal from the logic gate, and the clock input terminal receives the clock signal.

The aforementioned switching regulator may be an AC-DC switching power converter or a DC-DC switching power converter.

The objectives, technical details, features, and effects of the present invention will be better understood with regard to the detailed description of the embodiments below.

DESCRIPTION OF THE PREFERRED EMBODIMENTS

Figure 1:
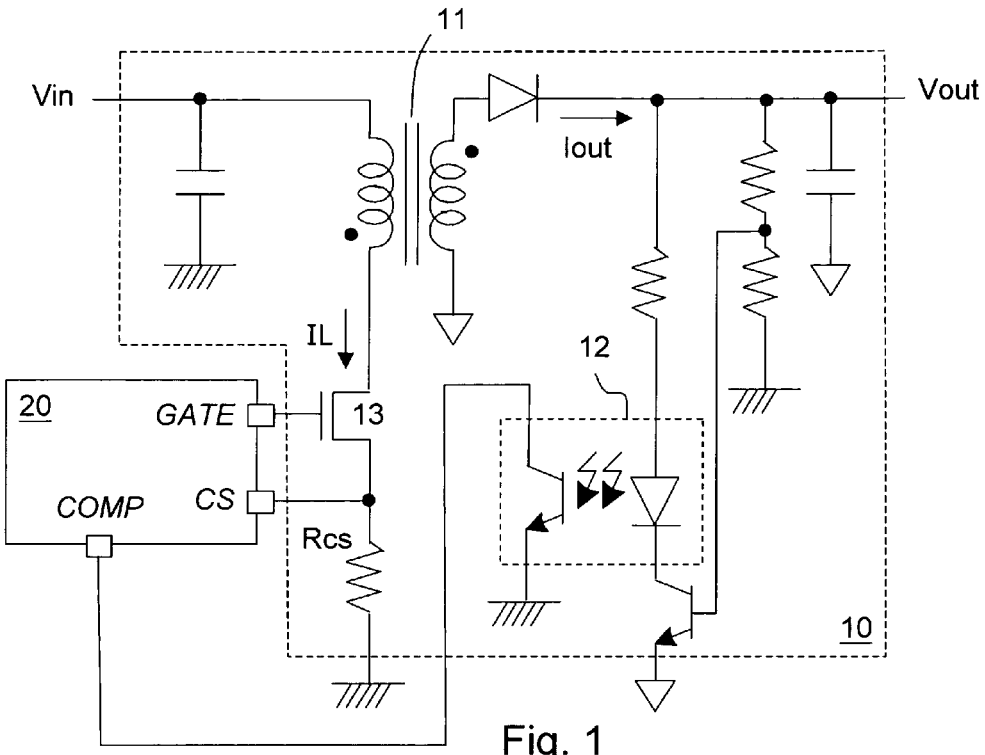
FIG. 1 illustrates a schematic circuit diagram of a prior art AC-DC switching regulator circuit and its controller circuit.
Figure 2:
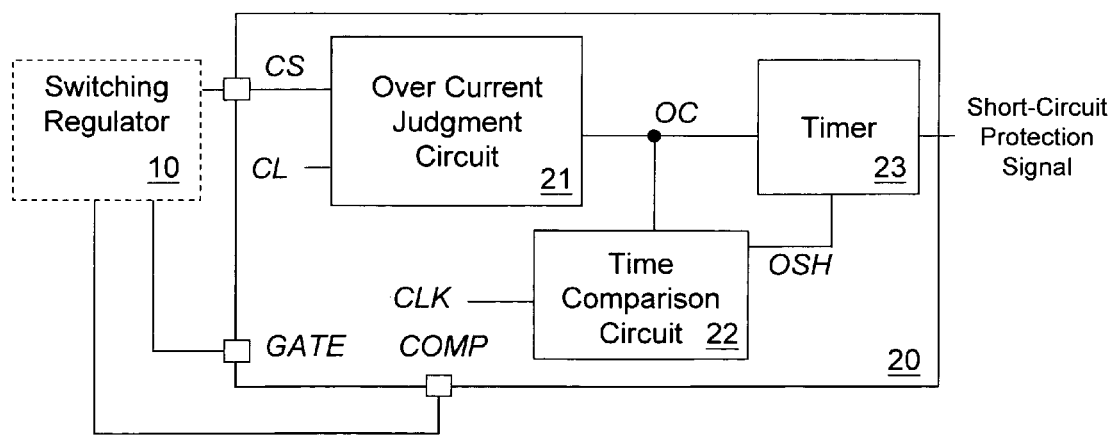
FIG. 2 shows an embodiment of the present invention.

FIG. 2 shows an embodiment of the present invention. The present invention can be applied to any AC-DC or DC-DC power converter, not limited to the AC-DC power converter as shown in FIG. 1. Both AC-DC and DC-DC switching power converters have a mechanism of generating a current sense signal, which is well known in this art. As shown in FIG. 2, the current sense signal CS generated by the switching regulator 10 is inputted to the over current judgment circuit 21 of the switching regulator control circuit 20. The over current judgment circuit 21 compares the current sense signal CS with a current limit CL to determine whether an over current condition occurs, and the over current judgment circuit 21 generates an over current indication signal OC which is inputted to both a time comparison circuit 22 and a timer 23. The timer 23 has two time settings: a first time period T1 and a second time period T2. The first time period T1 is longer, corresponding to a first time setting for triggering safety protection measure in a mild over current condition. The second time period T2 is shorter, corresponding to a second time setting for triggering safety protection measure in an output short-circuit condition. The timer 23 receives the over current indication signal OC and counts the pulse number of the over current indication signal OC, that is, the timer 23 counts the lasting time of the over current condition. When this over current condition lasts longer than the first time period T1, the switching regulator control circuit 20 outputs an output short-circuit protection signal to trigger an output short-circuit protection measure.

On the other hand, the time comparison circuit 22 receives a clock signal CLK besides the over current indication signal OC. The time comparison circuit 22 compares the clock signal CLK and the over current indication signal OC to determine whether an over current condition is caused by output short-circuit. The time comparison circuit 22 outputs an output short-circuit indication signal OSH to the timer 23. If the output short-circuit indication signal OSH indicates an output short-circuit condition, the timer 23 changes to the second time setting, wherein it counts the pulse number of the over current indication signal OC to determine whether the over current condition lasts longer than the second time period T2 which is shorter. And if yes, the switching regulator control circuit 20 outputs an output short-circuit protection signal to trigger an output short-circuit protection measure.

Figure 3:
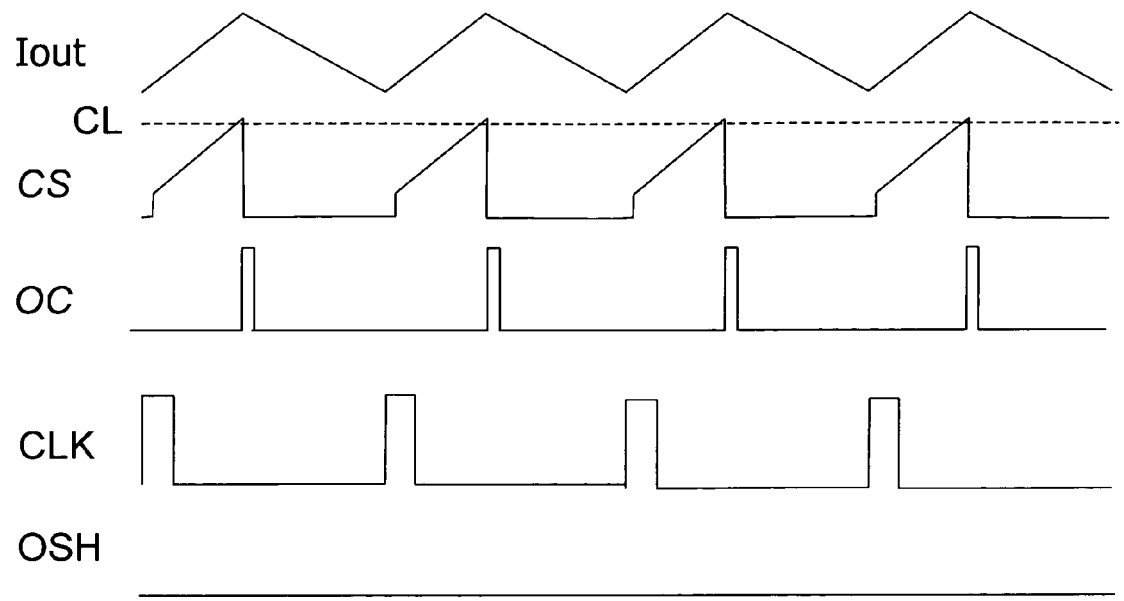
FIG. 3 shows the signal waveforms in general mild over current conditions according to an embodiment of the present invention.

The following description explains why the output short-circuit condition can be distinguished from the other mild over current conditions by comparing the over current indication signal OC and the clock signal CLK. Assuming that the switching regulator 10 is the AC-DC switching power converter as shown in FIG. 1, FIG. 3 shows the signal waveforms in general mild over current conditions according to the above embodiment of the present invention. As shown in FIG. 3, when the current sense signal CS reaches the current limit CL, it indicates that the current sense signal CS is too high, that is, an over current condition occurs. Hence, the primary side power transistor switch 13 turns OFF, and the switching regulator control circuit 20 generates the over current indication signal OC. Because the power transistor switch 13 is OFF, the output current Iout gradually decreases as shown in the first waveform of this figure, until the beginning of the clock signal CLK of the next cycle. In the next cycle, the power transistor switch 13 turns ON, and the current sense signal CS rises up and reaches the current limit CL again, so the over current indication signal OC is generated again. If the current sense signal CS continuously reaches the current limit CL, it indicates that the circuit is abnormal, and the short-circuit protection measure should be triggered. In the case described above, the over-current condition is not caused by output short-circuit, so the output current Iout will gradually decrease when the power transistor switch 13 is OFF. In addition, after the clock signal CLK is received in the next cycle, it will take a relatively longer period of time for the current sense signal CS to reach the current limit CL, that is, the over current indication signal OC is generated after the end of the clock signal CLK.

Figure 4:
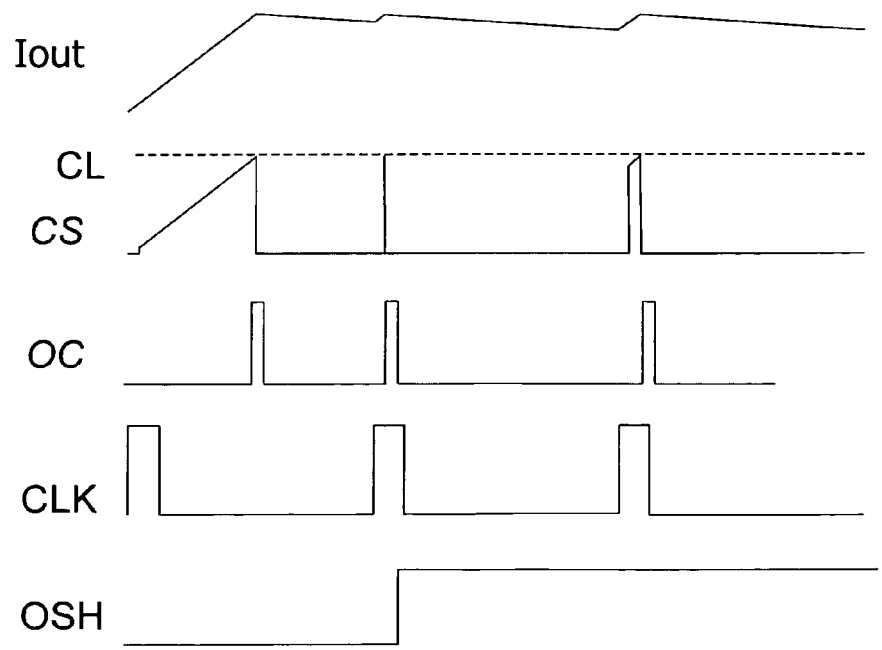
FIG. 4 shows the signal waveforms in an output short-circuit condition according to an embodiment of the present invention.

In contrast, FIG. 4 shows the signals waveforms of the circuit in an output short-circuit condition. As shown in this figure, in the output short-circuit condition, same as the general mild over current conditions, when the current sense signal CS reaches the current limit CL, the switching regulator control circuit 20 generates the over current indication signal OC, and the power transistor switch 13 turns OFF. But because the root cause of the over current condition is the output short-circuit, the output current Iout keeps at a very high value, dropping slightly at most, even though the power transistor switch 13 is OFF. Therefore, when the power transistor switch 13 turns ON at the clock signal CLK in the next cycle, the current sense signal CS reaches the current limit CL almost immediately. In other words, the over current indication signal OC will be generated in an extremely short time after the beginning of the clock signal CLK, not after the end of the clock signal CLK as in the general mild over current conditions. Referring to both FIGS. 3 and 4, whether the root cause of the over current condition is output short-circuit or not can be determined by comparing the timings of the over current indication signal OC and the clock signal CLK. As shown in the lowest waveform of FIG. 4, if the over current indication signal OC is generated before the end of the clock signal CLK, the circuit will generate the output short-circuit indication signal OSH to indicate output short-circuit.

Figure 5:
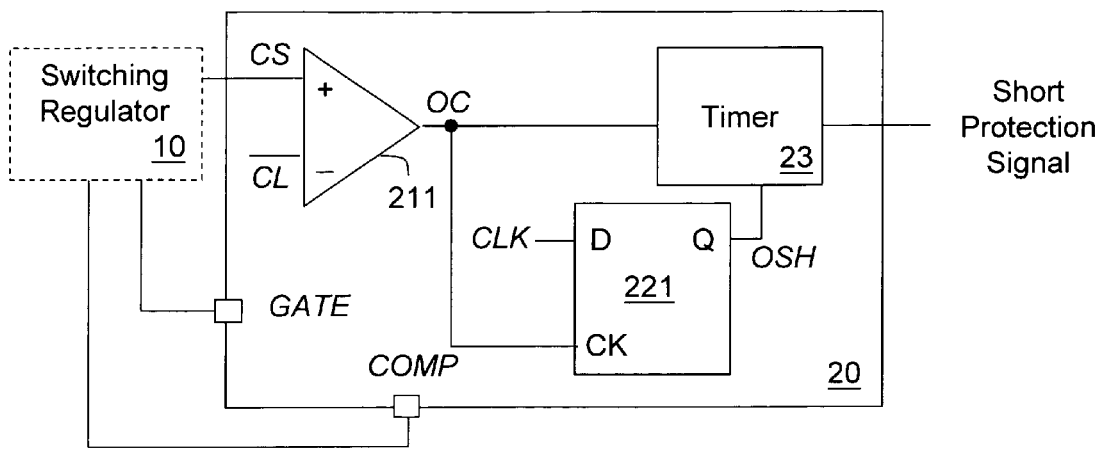
FIG. 5 shows a specific embodiment of the over current judgment circuit 21 and the time comparison circuit 22 of the present invention.

The over current judgment circuit 21 and the time comparison circuit 22 can be embodied in various forms. FIG. 5 shows one of the embodiments. In this embodiment, the over current judgment circuit 21 for example may be a comparator 211 which compares the current sense signal CS with the current limit CL to generate the over current indication signal OC. The time comparison circuit 22 for example may be a D-type flip-flop 221 which has a clock input terminal CK for receiving the over current indication signal OC, and an input terminal D for receiving the aforementioned clock signal CLK. In the over current condition, the clock input terminal CK receives the over current indication signal OC outputted from the comparator 211. If the root cause of the over current condition is the output short-circuit, the clock signal CLK will be still at high level; the output Q of the D-type flip-flop 221 follows the input D, such that the output short-circuit indication signal OSH from the D-type flip-flop 221 will be latched at high level as shown by the waveform OSH in FIG. 4. Accordingly, the timer 23 changes to the second setting, to determine whether to trigger the short-circuit protection measure based on the shorter second time period T2.

On the contrary, if it is a general mild over current condition, when the clock input terminal CK receives the over current indication signal OC, the clock signal CLK will be at low level; the output Q of the D-type flip-flop 221 follows the input D, such that the output short-circuit indication signal OSH from the D-type flip-flop 221 will be latched at low level as shown by the waveform OSH in FIG. 3. Accordingly, the timer 23 determines whether to trigger the short-circuit protection measure based on the longer first time period T1. As such, the output short-circuit condition which imposes immediate danger can be distinguished from the other mild over current conditions to improve the safety protection for the switching regulator, and besides, only a small-sized D-type flip-flop is required, so the circuitry is simple.

Figures 6, 7A, 7B:
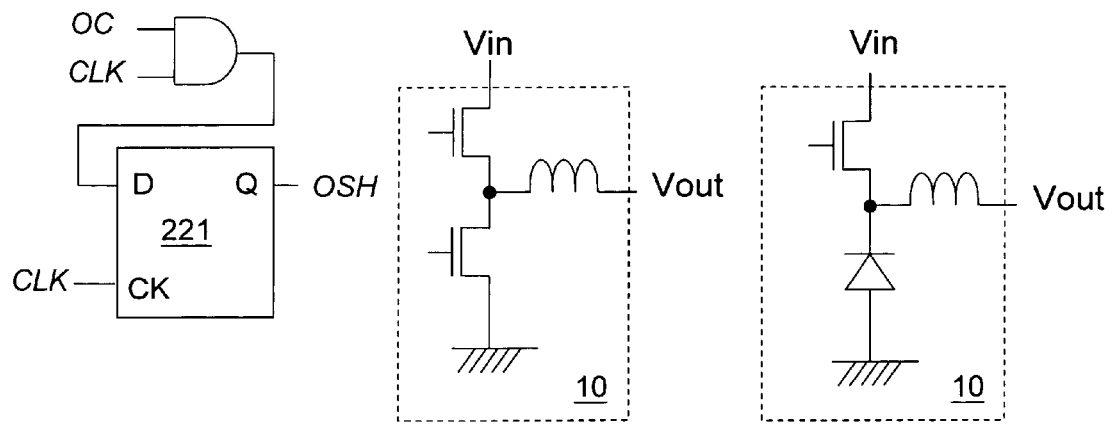
FIG. 6 shows another embodiment of the time comparison circuit 22.
FIGS. 7A and 7B are schematic circuit diagrams showing examples of a buck switching regulator.

What FIG. 5 shows is the simplest form of the time comparison circuit 22; only a D-type flip-flop is required. However, the present invention is not limited to such embodiment;

the concept of the present invention is to compare the timings of the over current indication signal OC with the clock signal CLK, and therefore, any method or hardware circuit which generates the output short-circuit indication signal OSH according to this concept should fall within the scope of the present invention. For example, FIG. 6 shows another embodiment wherein the over current indication signal OC and the clock signal CLK are subject to logic operations. When both signals are high, it indicates output short-circuit, and the flip-flop 221 generates the output short-circuit indication signal OSH. This embodiment requires one more logic gate as compared to the embodiment shown in FIG. 5. Although it is not the simplest, it is still within the scope of the present invention.

Figure 8A:
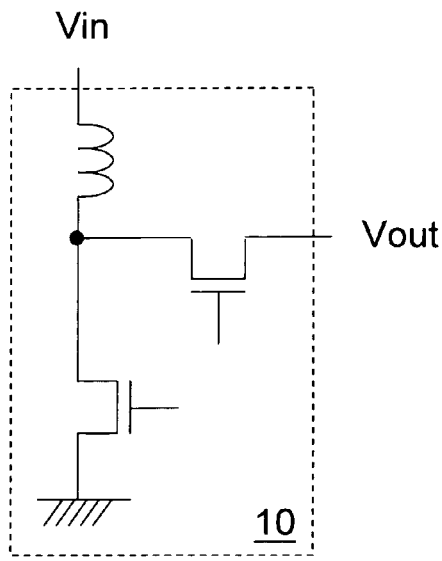
FIGS. 8A and 8B are schematic circuit diagrams showing examples of a boost switching regulator.
Figure 8B:
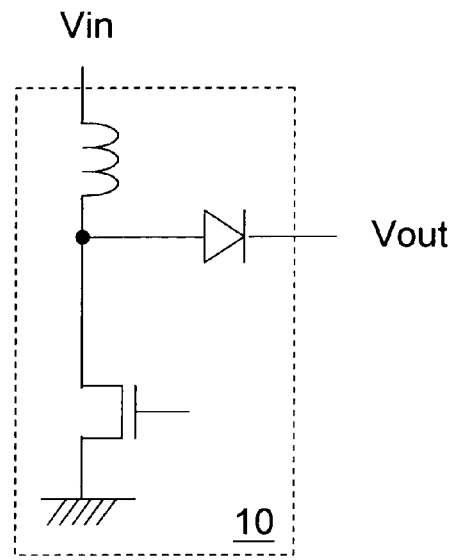
Figure 9A:
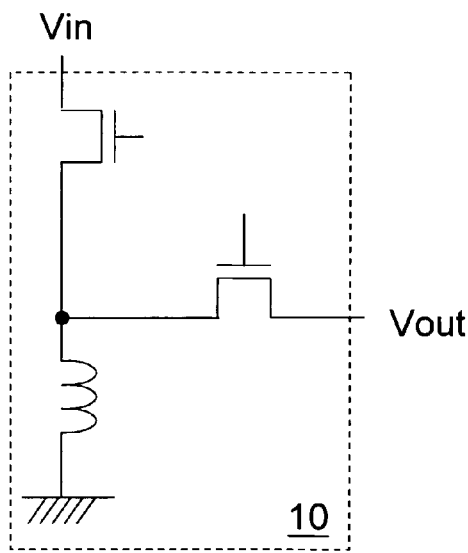
FIGS. 9A and 9B are schematic circuit diagrams showing examples of an inverter switching regulator.
Figure 9B:
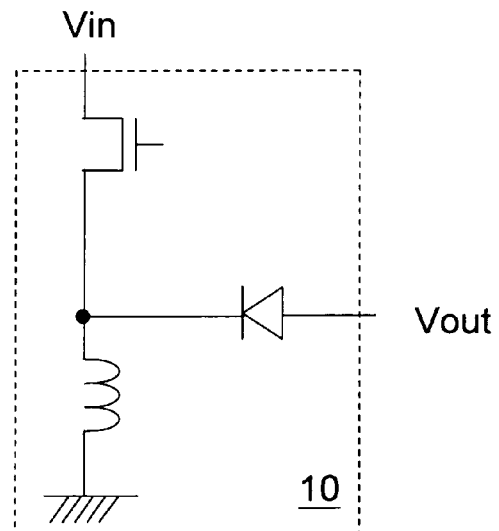
Figure 10A:
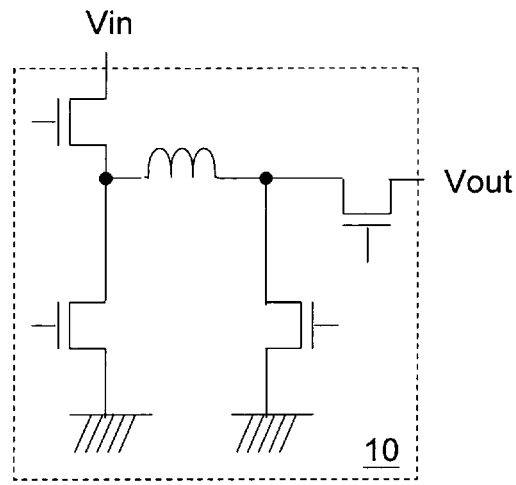
FIGS. 10A and 10B are schematic circuit diagrams showing examples of a buck-boost switching regulator.
Figure 10B:
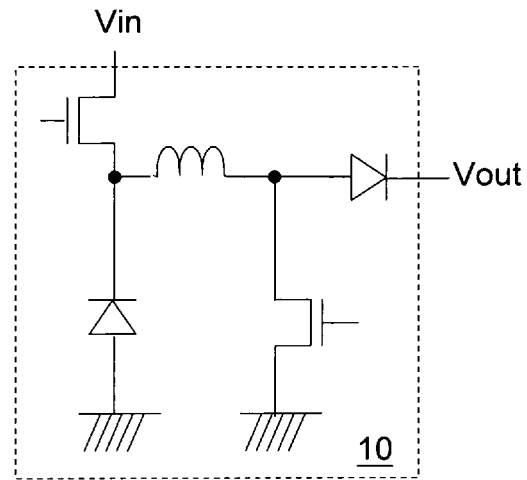
Figure 11A:
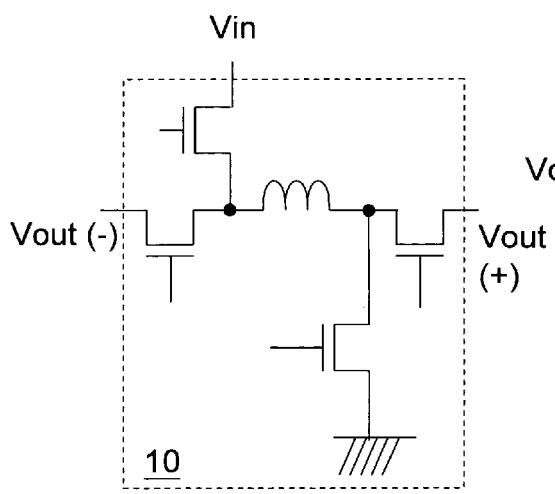
FIGS. 11A and 11B are schematic circuit diagrams showing examples of an inverter-boost switching regulator.
Figure 11B:
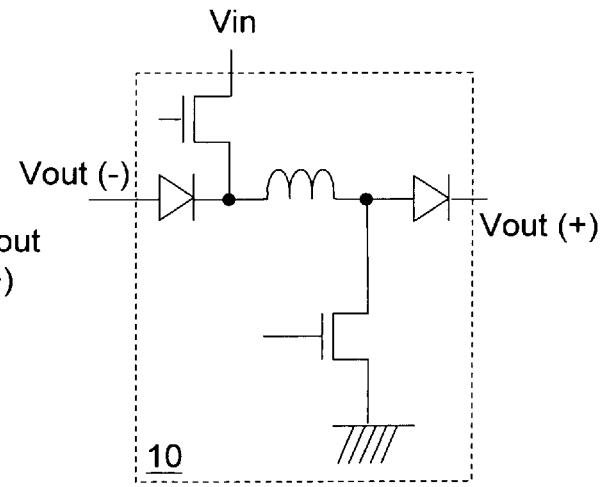

The switching regulator 10 in the embodiments is not limited to an AC-DC switching power converter, but can be a DC-DC switching power converter. If it is an AC-DC switching power converter, for example, the AC-DC switching power converter may be the one shown in the prior art FIG. 1. And if it is a DC-DC switching power converter, the DC-DC switching power converter for example may be a buck switching regulator as shown in FIG. 7A or FIG. 7B, a boost switching regulator as shown in FIG. 8A or FIG. 8B, an inverter switching regulator as shown in FIG. 9A or FIG. 9B, a buck-boost switching regulator as shown in FIG. 10A or FIG. 10B, or an inverter-boost switching regulator as shown in FIG. 11A or FIG. 11B.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the first time period T1 and the second time period T2 of the timer 23 can be set or modified according to the application requirement. As another example, the flip-flop is not limited to the D-type flip-flop 221, but can be other types of flip-flop. As yet another example, the meaning of high and low levels of a signal can be interchanged, with corresponding modification in the circuitry such as interchanging the positive and the negative input terminals of a comparator. In view of the foregoing, the spirit of the present invention should cover all such and other modifications and variations, which should be interpreted to fall within the scope of the following claims and their equivalents.

What is claimed is:

1. A switching regulator control circuit comprising:
    an over current judgment circuit comparing a current sense signal with a current limit to generate an over current indication signal;
    a time comparison circuit comparing the over current indication signal with a clock signal to determine whether the current sense signal continuously reaches the current limit in a time period and generate an output short-circuit indication signal accordingly; and
    a timer receiving the over current indication signal and the output short-circuit indication signal, wherein when the output short-circuit indication signal does not indicate an output short-circuit condition, the timer counts a first time period, and when the output short-circuit indication signal indicates an output short-circuit condition, the timer counts a second time period shorter than the first time period, and the timer outputs an output short-circuit protection signal at the end of the second time period.

2. The switching regulator control circuit of claim 1, wherein the over current judgment circuit includes a comparator for comparing the current sense signal with the current limit.

3. The switching regulator control circuit of claim 1, wherein the time comparison circuit includes a flip-flop which has a signal input terminal and a clock input terminal, wherein the signal input terminal is coupled to the clock signal and the clock input terminal is coupled to the over current indication signal.

4. The switching regulator control circuit of claim 1, wherein the time comparison circuit includes:
    a logic gate receiving the over current indication signal and the clock signal, and generating an output signal; and
    a flip-flop having an signal input terminal and a clock input terminal, wherein the signal input terminal receives the output signal from the logic gate, and the clock input terminal receives the clock signal.

5. The switching regulator control circuit of claim 1, wherein the switching regulator is an AC-DC switching power converter or a DC-DC switching power converter.

* * * * *